United States Patent [19]

Iwamoto et al.

[11] Patent Number: 4,808,661

[45] Date of Patent: Feb. 28, 1989

[54] RUBBER DISPERSED COPOLYMER RESIN

[75] Inventors: Mune Iwamoto, Yokohama; Norifumi Ito, Kamakura; Kazuo Sugazaki, Yokohama; Tetsuyuki Matsubara, Yokohama; Toshihiko Ando, Yokohama, all of Japan

[73] Assignee: Mitsui Toatsu Chemicals, Incorporated, Tokyo, Japan

[21] Appl. No.: 899,867

[22] Filed: Aug. 25, 1986

[30] Foreign Application Priority Data

Aug. 27, 1985 [JP] Japan ................... 60-186638
Dec. 27, 1985 [JP] Japan ................... 60-293192

[51] Int. Cl.$^4$ ............................. C08L 51/04
[52] U.S. Cl. ............................. 525/73; 525/282
[58] Field of Search ..................... 525/73, 282

[56] References Cited

U.S. PATENT DOCUMENTS

| | | | |
|---|---|---|---|
| 3,652,726 | 3/1972 | Nield et al. ............... | 260/876 |
| 3,721,724 | 3/1973 | Uebele et al. ............. | 260/880 R |
| 4,151,224 | 4/1979 | Hendy et al. .............. | 525/73 |
| 4,374,951 | 2/1983 | Lee et al. .................. | 525/73 |
| 4,381,373 | 4/1983 | Ikuma ........................ | 525/73 |
| 4,510,287 | 4/1985 | Wu ............................ | 525/73 |
| 4,567,233 | 1/1986 | Tomono et al. ............ | 525/73 |

FOREIGN PATENT DOCUMENTS 58-129043 8/1983 Japan .
58-206657 12/1983 Japan .

*Primary Examiner*—Allan M. Lieberman
*Attorney, Agent, or Firm*—Fisher, Christen & Sabol

[57] ABSTRACT

The invention provides a rubber dispersed copolymer resin having excellent heat resistance, impact strength and moldability and composed of (1) a dispersed phase formed of a rubbery polymer and copolymerized styrene-type, acrylonitrile-type and maleimide-type monomers, said rubbery polymer specifically controlled occluding the copolymer of monomers, being grafted with the copolymer and/or forming a multicomponent gel together with copolymers, and (2) a continuous phase formed at least of a specifically controlled copolymer of the styrenetype, acrylonitrile-type and maleimide-type monomers. The resin is useful as a molding material for electric appliances, electronic equipment and cars.

6 Claims, 1 Drawing Sheet

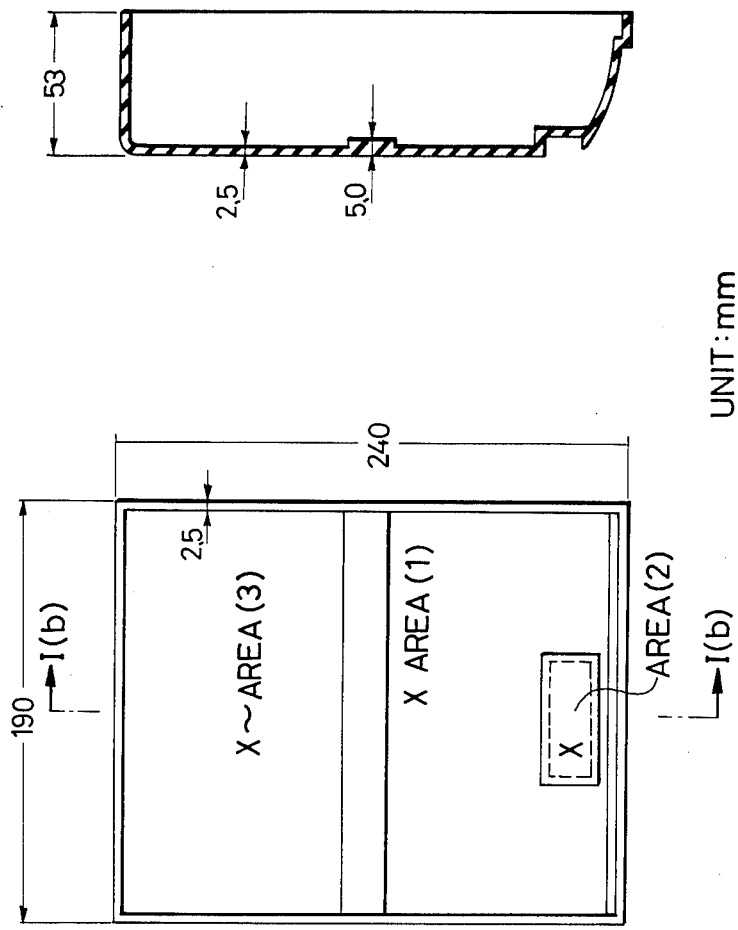

RUBBER DISPERSED COPOLYMER RESIN

BACKGROUND OF THE INVENTION (a) Field of the Invention

This invention relates to a rubber dispersed copolymer resin having excellent heat resistance, impact strength and moldability. The resin of this invention has utility as a molding material, for example, for various parts in electric appliances, electronic equipment, cars, etc.

(b) Description of the Prior Art

Numerous attempts have heretofore been made to improve the heat resistance of vinyl polymers by copolymerization. As common tendency, there was such a problem that the impact resistance was lowered when the heat resistance was improved. With a view toward overcoming such a problem, there have been proposed resin compositions in each of which a copolymer and graft copolymer of an N-substituted maleimide and a vinyl monomer are mixed under specific conditions (for example, Japanese Patent Laid-Open Nos. 129043/1983, 206657/1983, etc.). In such compositions, the property balance between their heat resistance and Izod impact strength is maintained better than that in conventional resins (ABS) which are each composed of a copolymer and graft copolymer of a styrene-type monomer and an acrylonitrile-type monomer. However, there is still a room for further improvement in such conventional resins, especially, in connection with their maximum permissible impact strength.

On the other hand, it has also been proposed in U.S. Pat. No. 3,721,724 to polymerize a styrene-type monomer, acrylonitrile-type monomer and maleimide-type monomer in the presence of 1-20 wt. % pf a conjugated diolefin elastomer as a polymerization process for a copolymer having high impact strength and softening point. Although copolymers produced by this process had high Izod impact strength and high softening points, they were not satisfactory in maximum permissible impact strength.

Further, U.S. Pat. No. 3,652,726 discloses certain graft polymers. This specification is however silent about an improvement to the maximum permissible impact strength of a polymer by special grafting or occluding.

These days, heat resistant resins are used as molded parts of large dimensions and/or complex configurations in the fields of electric appliances, electronic equipment and cars. There is thus a strong demand for improvements to such resins in their moldability along with their heat resistance and maximum permissible impact strength. The term "maximum permissible impact strength" as used herein means resistance to impacts which are to be applied to a molded article in the course of its actual use due to its drop or application of impacts thereto. Especially, large molded articles having high heat resistance are weakest to impacts at areas where their wall thicknesses change or which are close to corners. There has thus been a demand for their improvement.

The maximum permissible impact strength of a resin does not correspond to the Izod impact strength of the same resin. It depends on the falling weight impact strength of a molded article at the above-mentioned areas, rather than its Izod impact strength. In connection with moldability, the flowability of a resin upon its molding generally tends to decrease when the resin is copolymerized with a heat resistance imparting monomer, the amount of rubbery component is increased and/or the molecular weight of the copolymer is increased so as to improve the heat resistance and maximum permissible impact strength of the resin. Serious problems in the above case were encountered because the molding cycle became longer, when the molding was done at a higher temperature and sometimes, even if the molding pressure was increased, the resin was not filled sufficiently in a mold and the molding operation itself was no longer feasible.

SUMMARY OF THE INVENTION

An object of this invention is to provide, as a resin material for molded articles of large sizes and complex configurations, a rubber dispersed copolymer resin having significantly improved balance among its heat resistance, maximum permissible impact strength and moldability and especially composed of a styrene-type monomer, acrylonitrile-type monomer, maleimide-type monomer and rubbery polymer.

The above-described object of this invention is attained by providing a rubber dispersed copolymer resin comprising a dispersed phase formed of a rubbery polymer and copolymerized styrene-type, acrylonitrile-type and maleimide-type monomers, said rubbery polymer occluding the copolymer of said styrene-type, acrylonitrile-type and maleimide-type monomers, being grafted with the copolymer and/or forming a multi-component gel with copolymers; and a continuous phase formed of a copolymer of additional portions of the styrene-type, acrylonitrile-type and maleimide-type monomers.

In a more specific aspect of this invention, there is provided a rubber dispersed copolymer resin of the above-described type, in which (a) the rubbery polymer in the dispersed phase occludes the copolymer of the styrene-type, acrylonitrile-type and maleimide-type monomers and/or is grafted with the copolymer, the proportion of the occluded and/or grafted copolymer (GCP) is 50–100 parts by weight based on 100 parts by weight of the rubbery polymer;

(b) the proportion (X) of the copolymerized maleimide-type monomer in GCP is 1–25 wt. %;

(c) the proportion (Y) of the additional portion of the maleimide-type monomer in the copolymer of the continuous phase is 1–25 wt. %; and (d) X and Y satisfy the following inequality (I):

$$0.5 < Y/X < 2.0 \quad (I)$$

In another more specific aspect of this invention, there is provided a rubber dispersed copolymer resin comprising:

(a) a dispersed phase formed of a multicomponent gel, which contains the following three components:
   (i) a rubbery polymer;
   (ii) a copolymer of a styrene-type monomer and an acrylonitrile-type monomer;
   (iii) a copolymer of a styrene-type monomer, an acrylonitrile-type monomer and a maleimide-type monomer, when the total amount of the multicomponent gel is supposed to be 100 parts by weight, the rubbery polymer (i) is contained in an amount of 30–70 parts by weight and the total amount of the latter two copolymers (ii) and (iii) is 70–30 parts by weight; and (b) a continuous phase formed at least of a copolymer of a maleimide-type monomer, styrene-type monomer and acrylonitrile-type monomer.

The rubber dispersed copolymer resins of this invention are excellent in maximum permissible impact strength, heat resistance and moldability and in external appearance and have great commercial utility in the field of parts for electric appliances, electronic equipment and cars.

BRIEF DESCRIPTION OF THE DRAWINGS

FIG. 1(a) and FIG. 1(b) show the shape of a molded article subjected to a falling weight impact strength test, in which FIG. 1(a) is a plan view and FIG. 1(b) is a cross-sectional view.

DETAILED DESCRIPTION OF THE INVENTION

By the term "resin formed of a dispersed phase and a continuous phase" as used herein, is meant a resin capable of showing sea (continuous phase) and islands (dispersed rubber phase) in its electron micrograph, for example, as typified by HIPS (high-impact polystyrene resin). In the present invention, it is essential that the copolymer in each of the continuous phase and dispersed rubber phase be composed of the styrene-type monomer, acrylonitriletype monomer and maleimide-type monomer.

Furthermore, the continuous phase is a part which has such properties as being dissolved by a 7:3 mixed solvent of methyl ethyl ketone and methanol, while the dispersed phase is a part of such properties as being undissolved by the same solvent.

The term "copolymerized monomer" as used herein means reacted moieties of the corresponding monomer, which form the molecular chain of a polymer by a polymerization reaction.

Exemplary of the styrene-type monomer useful in the practice of this invention are side chain alkyl-substituted styrenes such as α-methylstyrene and α-ethylstyrene, nuclear alkyl-substituted styrenes such as monochlorostyrene, dichlorostyrene, vinyltoluene, vinylxylene, o-t-butylstyrene, p-t-butylstyrene and p-methylstyrene, halogenated styrenes such as tribromostyrene and tetrabromostyrene, p-hydroxystyrene, o-methoxystyrene, vinylnaphthalene, and so on. Among these, styrene and α-methylstyrene are particularly preferred. Such styrene-type monomers may be used either individually or in combination.

Illustrative of the acrylonitrile-type monomer useful in the practice of this invention include acrylonitrile, methacrylonitrile, fumaronitrile, maleonitrile, α-chloroacrylonitrile, etc., with acrylonitrile being particularly preferred. Such acrylonitrile-type monomers may be used either individually or in combination.

Maleimide-type monomers useful in the practice of this invention are represented by the following formula:

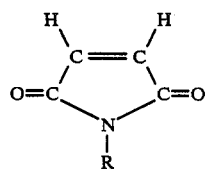

wherein R means a hydrogen atom, an alkyl or cycloalkyl group having 1–15 carbon atoms, or an aromatic residuum. As exemplary maleimide-type monomers, may be mentioned maleimide, N-methylmaleimide, N-ethylmaleimide, N-propylmaleimide, N-t-butylmaleimide, N-isopropylmaleimide, N-cyclohexylmaleimide, N-phenylmaleimide, N-naphtylmaleimide, N-o-chlorophenylmaleimide and the like. Particularly preferred are maleimide, N-methylmaleimide, N-phenylmaleimide, N-cyclohexylmaleimide and so on. Such maleimide-type monomers may be used either individually or in combination.

In the present invention, a fourth monomer may be used by copolymerizing same where required. In this case, fourth copolymerizable monomer may be used in an amount of not more than 50 wt. %, preferably, not more than 30 wt. % of the total amount of the above-mentioned copolymerized styrene-type monomer and acrylonitrile-type monomer. As illustrative example of such a fourth monomer, may be mentioned methacrylic ester monomers such as methyl methacrylate and acrylic ester such as methyl acrylate, etc.

The term "rubbery polymer" as used herein means diene-type rubbers such as polybutadiene rubber, acrylonitrile-butadiene copolymer rubber (NBR) and styrene-butadiene copolymer rubber (SBR), acrylic rubbers such as polybutyl acrylate and polypropyl acrylate, ethylene-propylene-diene type rubber (EPDM). Among these, polybutadiene rubber and SBR are used most preferably.

By using the above-described rubbery polymer and styrene-type, acrylonitrile-type and maleimide-type monomers, a rubber dispersed copolymer resin which has the specific dispersed phase in which a specific copolymer of the monomers is occluded and/or grafted on the rubbery polymer and/or the copolymer and rubbery polymer form a multicomponent gel, that is, a complexed rubber gel and the continuous phase formed of a specific copolymer of the monomers can themselves be formed in accordance with routine polymerization techniques. More specifically, they may be formed by using polymerization techniques which will be described subsequently.

In each rubber dispersed copolymer resin of this invention, the reduced viscosity of a 0.5 wt. % solution of the copolymer of its continuous phase in dimethylformamide (DMF) may preferably be 0.5–1.0 dl/g, more preferably 0.6–0.9 dl/g, most preferably 0.6–0.85 dl/g at 30° C. If this value exceeds 1.0, the flowability is deteriorated extremely. On the other hand, any values smaller than 0.5 result in reduced impact strength. The reduced viscosity is measured in the following manner. Namely, a rubber dispersed copolymer resin is dispersed in a 7:3 mixed solvent of methyl ethyl ketone and methanol. Matter insoluble in the mixed solvent is then removed by centrifugation. The solvent with components dissolved therein is then poured in about 20 volumes of methanol, followed by reprecipitation. After collecting the resulting precipitate by filtration and then drying same, its reduced viscosity is measured by using dimethylformamide.

Each rubber dispersed copolymer resin of this invention may be added with a conventional antioxidant such as a hindered phenol-type antioxidant, phosphorustype antioxidant or sulfur-type antioxidant to improve its thermal stability or with a lubricant to improve its flowability further. Depending what end use will be made, it may also be possible to incorporate fibrous reinforcing agents such as glass fibers, inorganic fillers, colorants and pigments. Further, a conventional flame retardant of the halogenated organic compound type such as tetrabromobisphenol A, decabromobiphenyl ether or brominated polycarbonate may also be mixed in each resin composition of this invention to make it flame-retardant.

Each rubber dispersed copolymer resin of this invention may be subject to molding after blending it with another resin such as polyvinyl chloride, styreneacrylonitrile resin, polycarbonate, polybutylene terephthalate, polyethylene terephthalate, nylon 6, nylon 66, nylon 12, polyphenylene oxide or polyphenylene sulfide.

Each rubber dispersed copolymer resin of this invention may be improved further to impart more preferable moldability and to permit production of molded articles having more preferable physical properties by suitably choosing the form of bonding between the rubbery polymer and the copolymer formed of the styrene-type monomer, acrylonitrile-type monomer and maleimide-type monomer.

As specific examples, may be mentioned a first form of bonding in which the rubbery polymer occludes the copolymer of the monomers and/or is grafted with the polymerized monomers and as a more preferred form, a second form of bonding in which the rubbery polymer and copolymer forms a multicomponent gel.

The first form of bonding will hereinafter be described.

In the first form of bonding, supposing the total amount of the rubbery polymer and occluded or grafted copolymer (hereinafter abbreviated as "GCP") and the copolymer in the continuous phase in the rubber dispersed copolymer resin is 100 wt. %, it is preferred to have such a composition that the amount of the rubbery polymer ranges from 3 to 20 wt. % and the total amount of GCP and the copolymer in the continuous phase ranges from 97 to 80 wt. %. Supposing that the total amount of GCP and the copolymer contained in the continuous phase is 100 wt. %, a preferable copolymer comprises 30–80 wt. % of styrene-type monomer, 10–50 wt. % of acrylonitrile-type monomer, 1–25 wt. % of maleimide-type monomer and 0–20 wt. % of one or more other monomers. Especially, the ratio of the styrene-type monomer to acrylonitrile-type monomer may preferably be in the range of 60/40–77/23 (wt. %/wt. %), notably, 65/35–74/26 (wt. %/wt. %).

In the first form of bonding, the proportion of GCP per 100 parts by weight of the rubbery polymer in the dispersed phase may be 50–100 parts by weight, preferably, 60–90 parts by weight.

The proportion of such GCP is determined in accordance with the following equation by precisely weighing about 1 g (a gram) of the rubber dispersed copolymer resin, dispersing it in 30 cc of a 7:3 mixed solvent of methyl ethyl ketone and methanol, separating insoluble matter by centrifugation and drying same, and then precisely measuring the weight (b gram) of the insoluble matter:

$$\text{Proportion of GCP (wt. \%)} = \left( \frac{b}{a \times c/100} - 1 \right) \times 100$$

wherein c (wt. %) means the weight concentration of the rubbery polymer in the rubbery dispersed copolymer resin (a). Any GCP proportions smaller than 50 parts by weight result in reduced maximum permissible impact strength, while any GCP proportions greater than 100 parts by weight lead to deteriorated moldability.

The proportion (X) of the copolymerized maleimide-type monomer in GCP may be 1–25 wt. %, preferably 3–20 wt. %. Any proportions smaller than 1 wt. % lead to poor heat resistance while any proportions higher than 25 wt. % result in lowered impact resistance. The proportion of the copolymerized maleimidetype monomer can be determined by the elemental analysis of N, C, H and O in GCP.

The proportion (Y) of the copolymerized maleimide-type monomer in the copolymer of the continuous phase may also be 1–25 wt. %, more preferably 3–20 wt. %, most preferably 4–17 wt. %. Any proportions smaller than 1 wt. % lead to poor heat resistance while any proportions higher than 25 wt. % result in significantly lowered impact resistance. The proportion of such a copolymerized maleimide-type monomer can be determined by elemental analysis.

It is preferable that X and Y satisfy the following inequality (I), preferably (I'):

$$0.5 < Y/X < 2.0 \tag{I}$$

$$0.5 < Y/X < 1.5 \tag{I'}$$

If the value Y/X is smaller than 0.5 or greater than 2.0, the maximum permissible impact strength is significantly reduced.

The rubber dispersed copolymer resin may preferably be produced, for example, by a continuous bulk polymerization technique. This production process is now described further. The polymerization is conducted by using a reactor equipped with two or more stirred reaction, namely, polymerization zones. From the final polymerization zone, the resulting polymerization mixture which is composed of the rubbery polymer, the resulting copolymer, unreacted monomers, solvent, etc., is fed to a removal step of volatile components, where the polymerization mixture is separated into a rubber dispersed copolymer resin and volatile components. Accordingly, the rubber dispersed copolymer resin is obtained. In such a process, the rubbery polymer dissolved in a portion or the whole portion of one or more of the monomers is fed to the first polymerization zone, whereas the emaining monomers, a polymerization initiator and a chain transfer agent can be fed to the reactor at a desired stage of the polymerization.

The amount of GCP is adjusted in accordance with the type and amount of the polymerization initiator, the intensity of stirring, the type and amount of the rubbery polymer, the amounts and types of the monomers and the details of the removal step of volatile components. In general, the amount of GCP tends to increase as the amount of the polymerization initiator increases, the intensity of stirring becomes lower, the content of the copolymerized diene component in the rubbery polymer increases, the amount of the rubber polymer decreases, the amount of the copolymerized styrene-type monomer increases, and/or the temperature of the removal step of volatile components becomes higher. GCP can be obtained in a desired amount by those skilled in the art by adjusting such parameters in accordance with the trial and error method.

The contents of the copolymerized meleimide-type monomer residua in GCP and the copolymer in the continuous phase are adjusted depending on the amount of the maleimide-type monomer to be provided for the reaction.

The value Y/X can be adjusted by the stage of polymerization, at which the maleimide-type monomer is added, and by its amount. In general, Y/X becomes smaller when the maleimide-type monomer is added in a large amount at a stage where the degree of progress of the polymerization is low. On the contrary, Y/X becomes greater when the maleimide-type monomer is added in a large amount at a stage where the degree of progress of the polymerization has become high. Further, Y/X approaches 1 when the maleimide-type monomer is supplied evenly. It is not absolutely necessary to control Y/X at 1 for the attainment of the objects of this invention. Any Y/X may be chosen within its range specified by the present invention.

In the rubber dispersed copolymer resin, the crosslinking degree index of the dispersed phase may preferably 4–11 times, more preferably 6–11 times, and most preferably 6–10 times. Such a crosslinking degree index of the dispersed phase can be measured by the following method. Namely, 0.4 g of the rubber dispersed copolymer resin is partially dissolved in 30 cc of a 7:3 mixed solvent of toluene and methyl ethyl ketone. After centrifugation, the weight of insoluble matter which has been caused to swell by the solvent is measured ($w_1$). After the weighing, the insoluble matter is dried in vacuum and is weighed again ($w_2$) The crosslinking degree index is defined as $w_1/w_2$. The crosslinking degree index is dependent on the amount and type of the polymerization initiator and the temperature and residence time upon treatment for the removal of volatile components. In addition, it also depends on the amount of the maleimide-type monomer to be copolymerized. A suitable crosslinking degree index may be achieved by those skilled in the art by choosing suitable production process conditions in accordance with the trial and error method. Any crosslinking degree indexes smaller than 4 lead to considerably low impact strength and also to low flowability. The maximum permissible impact strength is also reduced when the crosslinking degree index exceeds 11.

It has not been fully elucidated why the above-described rubber dispersed copolymer resin has excellently-balanced properties, i.e., heat resistance, maximum permissible impact strength and moldability. The maximum permissible impact strength appears to be attributable to the mechanism that since GCP contained in the rubbery polymer is a copolymer containing a suitable amount of the maleimide-type monomer, the effects of the rubbery polymer component are enhanced and the mutual bonding between the copolymer in the continuous phase and that in the GCP phase is strengthened.

The second form of bonding will next be described.

In the second form of bonding, the dispersed phase is composed of a multicomponent gel (hereinafter abbreviated as "MG" for the sake of brevity). MG is formed in multiple steps by a bulk or solution polymerization technique. MG is prepared by polymerizing a styrene-type monomer and an acrylonitrile-type monomer in the presence of a rubbery polymer by a bulk or solution polymerization technique to form a dispersed gel phase (step for the formation of a dispersed gel phase) and then by polymerizing a maleimide-type monomer, a styrene-type monomer and an acrylonitrile-type monomer in the presence of the dispersed gel phase. Thus, MG is formed in such a manner that it contains two types of copolymers as its components.

When an emulsion polymerization technique is relied upon or the maleimide-type monomer is copolymerized prior to the formation of the dispersed gel phase, it is difficult to form a dispersed phase which contains a multicomponent gel.

As to the composition of such MG, supposing its total amount be 100 parts by weight, the rubbery polymer accounts for 30–70 parts by weight, preferably, 30–55 parts by weight, the total amount of the copolymers may be 70–30 parts by weight, preferably, 70–45 parts by weight. If the proportion exceeds 70 parts by weight, even the notched Izod impact strength is also lowered and the resultant resin is no longer suited as a molding material for high-impact applications. In MG, the copolymers are (ii) the copolymer of the styrene-type monomer and acrylonitrile-type monomer and (iii) the copolymer of the styrene-type monomer, acrylonitrile-type monomer and maleimide-type monomer. The copolymer (ii) is formed primarily in the formation step of the multicomponent gel, while the copolymer (iii) is formed in the dispersed gel phase formation step. The maleimide-type monomer is not used in the dispersed gel phase formation step. Supposing the total amount of the dispersed gel phase be 100 parts by weight, it is preferred that a dispersed gel phase consisting of 71–31 parts by weight of the rubbery polymer and 29–69 parts by weight of a copolymer of the styrene-type monomer and acrylonitrile-type monomer is formed in the dispersed gel phase formation step. The structure of the dispersed gel phase can be analyzed by a method which will subsequently be described under B in Example 4.

As described above, MG must contain two types of polymers in addition to the rubbery polymer because the maximum permissible impact strength is low if only one of the former polymers is contained.

It is not clear why MG exhibits such effects for the improvement of the maximum permissible impact strength. Since the maximum permissible impact strength is dependent on the amounts and types of the copolymers in MG, MG of this invention appears to be effective in enhancing the bonding between the dispersed phase and the continuous phase and the reinforcing effects of the rubbery polymer. The compositions of the copolymers other than the rubbery polymer in MG may be controlled by choosing polymerization parameters when they are formed by the bulk or solution polymerization technique. In general, the contents of the copolymers other than the rubbery polymer tend to increase in MG as the amount of the polymerization initiator (for example, organic peroxide) increases or the conversions become greater in their polymerization steps and in connection with the associated rubbery polymer, a polybutadiene containing more 1,2-vinyl bonds is used or a rubbery polymer having a higher viscosity as measured in the form of a 5% styrene solution is used. Their contents can be adjusted suitably by those skilled in the art by the trial and error method.

Preferably, each MG particle contains at least one cell having a diameter of at least 0.05 $\mu$m, preferably, 0.07 $\mu$m. It is also preferable that the total amount of MG particles, each of which contains at least one cell having a diameter of at least 0.05 $\mu$m, preferably, at least 0.07 $\mu$m, accounts for at least 50 wt. %, preferably, at least 70 wt. % of the whole MG. Such cells are observed as islands in the phase of MG in an electron micrograph. If the diameters of these cells and/or the proportion of MG particles having cells of such diameters do not fall within the above-described ranges, the impact resistance of the resulting resin is low. For the formation of MG with such a cell structure, it is effective to conduct the dispersed gel phase formation step by a bulk or solution polymerization technique. The cell diameter and the content of MG particles having diameters in the above-described range may be adjusted by those skilled in the art, for example, by choosing the composition of the rubbery polymer to be used. For example, the cell diameter tends to increase and the content of MG particles having diameters in the above-described range tend to become higher, as the butadiene component contains more 1,2-vinyl bonds or the viscosity of the rubbery polymer as measured in the form of a 5% styrene solution becomes higher.

Such cell diameters can be measured in the following manner on the basis of an electron micrograph of 10,000 magnifications. In the electron micrograph of 10,000 magnifications, the diameters of dispersed 100–200 MG particles are measured. The longer and shorter diameters of each of the MG particles are measured. The diameter ($D_i$) of the MG particle is (the longer diameter + the shorter diameter)/2. With respect to every gel, $$S_1 = \frac{1}{4}\sum_i \pi n D_i^2$$

is calculated (n: number of particles). On the other hand, both longer diameter and shorter diameter are also measured with respected to each cell. The diameter of the cell is (its longer diameter + its shorter diameter)/2. In connection with each MG particle containing at least one cell the diameter of which is 0.05 μm or greater, its diameter ($d_i$), i.e., (its longer diameter + its shorter diameter)/2 is measured.

$$S_2 = \frac{1}{4}\sum_i \pi m d_i^2$$

is then calculated (m: number of particles). The weight percent of MG particles, each of which contains at least one cell of at least 0.05 μm, is calculated by the following equation: $S_2/S_1 \times 100$. MG particles having diameters of 0.1 μm or smaller are excluded from the above calculation.

The copolymer of the maleimide-type monomer, styrene-type monomer and acrylonitrile-type monomer, which constitutes the continuous layer, is effective in imparting well-balanced heat resistance and impact resistance. As to the composition of the whole resin forming the continuous phase, the maleimide-type monomer may amount to 1–30 wt. %, more preferably, 2–20 wt. %, the styrene-type monomer may account for 10–80 wt. %, more preferably, 20–70 wt. % and the acrylonitrile-type monomer may amount to 15–50 wt. %, more preferably 15–40 wt. %.

The above-described rubber dispersed copolymer resin is produced by a continuous bulk or continuous solution polymerization technique. Namely, the styrene-type monomer and acrylonitrile-type monomer are dissolved first of all in a solvent, followed by the addition of the rubbery polymer to prepare a feed solution. Thereafter, the feed solution is continuously supplied to one or more stirred tank reactors to form a dispersed gel phase. A polymerization mixture containing the thus-formed dispersed gel phase is continuously fed to another reactor, in which its polymerization reaction is continued to form skeletons of a multicomponent gel. Subsequent to the formation of the skeletons or in some instances, after completion of additional finishing polymerization, unreacted monomers and solvent are removed from the reaction mixture, usually, at 180°–290° C. so that a copolymer containing the multicomponent gel dispersed therein is obtained. In the course of such an overall preparation process, the conversion of the monomers to the polymer is successively increased, namely, from 5–35 wt. % in the dispersed gel phase formation step, through 20–80 wt. % in the formation step of the skeletons for the multicomponent gel, and to 30–80 wt. % in the finishing polymerization step, all based on the whole monomers fed to the reaction system.

As the styrene-type monomer which is employed to form the copolymer resin with the multicomponent gel dispersed therein, it is preferable to use styrene either singly or in combination with α-methylstyrene. From the viewpoint of achieving improved maximum permissible impact strength, the ratio of styrene to α-methylstyrene may preferably 100/10–100/70, more preferably, 100/15–100/50. Although it is not clear why such a ratio is preferred, these components seem to contribute to the maximum permissible impact strength because the combined use of styrene and α-methylstyrene at such a specific ratio leads to an increase to the proportion of the copolymer in the multicomponent gel.

The styrene-type monomer and acrylonitrile-type monomer, which are components of the rubber-dispersed copolymer resin, may be partly replaced by one or more of methacrylic ester type monomers such as methyl methacrylate and acrylic ester type monomers such as methyl methacrylate, provided that the proportion of one or more of the latter monomers is limited below 20 wt. % of the total amount of the former monomers.

The crosslinking degree index of the dispersed multicomponent gel may preferably be 4–11 times, more preferably 6–11 times, most preferably 6–10 times.

Ex. 1–3, Comp. Ex. 1–4 & Ref. Ex. 1:

A. Production of rubber dispersed copolymer resins (GCP-type):

Various rubber dispersed copolymer resins were separately obtained by changing reaction conditions from one to another in a continuous bulk polymerization apparatus which was constructed of five stirrer-equipped reactors, arranged in series, a preheater and a vacuum tank. To the first stirrer-equipped reactor, there was continuously charged a feed solution which contained 6 parts by weight of a rubbery polymer (polybutadiene), 20 parts by weight of ethylbenzene, 50 parts by weight of styrene and 24 parts by weight of acrylonitrile. In addition, another feed solution containing 50 parts by weight of styrene, 24 parts by weight of acrylonitrile and 26 parts by weight of N-phenylmaleimide was continuously added in portions to the first to fifth stirrer-equipped reactors. The feed amounts of these feed solutions were changed from one run to another. For the sake of comparison, a still further resin was also produced without addition of N-phenylmalemide. An organic peroxide was used as a polymerization initiator, while dodecyl mercaptan was employed as a molecular weight regulator. The temperature of the preheater was maintained at 260°–280° C. and the degree of vacuum in the vacuum tank was set at 70 torr. In Referential Example 1, a commercial super heat resistant brand ABS was used.

B. Evaluation:

B-1. Molding:

After drying the above-obtained resins at 80° C. for 3 hours, they were separately molded at a molding temperature of 240° C. and a mold temperature of 60° C. by an injection molding machine.

B-2. Evaluation of physical properties:

(1) Izod impact strength:

Measured in accordance with ASTM D-256.

(2) Evaluation of heat resistance:

Vicat softening points were measured in accordance with ASTM D 1525.

(3) Evaluation of moldability: The moldability of each resin was evaluated in terms of the hydraulic pressure of the molding machine required to produce the minimum injection pressure not to develop short shot in injection molding (short shot hydraulic pressure). Using the short shot hydraulic pressure of the commercial ABS (super heat resistant brand, Referential Example) as a standard, the moldability of each resin was evaluated on the basis of a difference in short short hydraulic pressure between the resin and the commercial ABS [A negative difference is evaluated as having a lower hydraulic pressure than that of the commercial ABS (super heat resistant grade) and as a material having good flowability upon its molding].

(4) Evaluation of maximum permissible impact strength: Each article obtained by injection molding and having a shape shown in FIGS. 1(a) and 1(b) was subjected at three areas (1), (2) and (3) to a falling weight impact strength test. The tip of the falling weight had a radius (R=6.4 mm) and the inner diameter of the base was 25 mm. At the area (1), the wall thickness varies. The area (2) is close to a corner, and the area (3) is a general area.

B-3. Evaluation results are summarized in Table 1.

Example 1 is directed to a rubber dispersed copolymer resin according to the present invention. In Comparative Example 1, the ratio of GCP to the rubbery polymer was high and the resin tended to develop short shot and had inferior moldability. In Comparative Example 2, the value Y/X was large and the maximum permissible impact strength was low. In Comparative Example 3, the content of the copolymerized maleimide-type monomer in the sum of GCP and the copolymer in the continuous phase was high and the impact strength was low. Comparative Example 4 did not use any maleimide-type monomer and the resultant resin had low heat resistance. In Examples 2 and 3, the tests were conducted by changing the contents of the rubbery polymer and maleimide-type monomer. The appearance of the articles, which were molded respectively from the resins of Examples 1, 2 and 3, showed no silver streaking, flow marks, jetting or the like and their surface gloss were excellent. Silver streaking and flow marks were observed on the article molded from the commercial super heat resistant brand ABS.

COMPARATIVE EXAMPLE 5

The resin of Comparative Example 3 were mixed at a ratio of 1:1 with an acrylonitrile-styrene copolymer resin (AS resin) and the resulting resin was evaluated in the same manner as in Example 1. The value Y/X was small, the content of the copolymerized maleimidetype monomer in GCP was high, and the impact strength was low. Results are shown in Table 1.

COMPARATIVE EXAMPLE 6

In the presence of 60 parts by weight of a polybutadiene rubber latex, were polymerized 10 parts by weight of N-phenylmaleimide, 22 parts by weight of styrene and 8 parts of acrylonitrile to obtain a rubber-containing resin ($R_1$). On the side, N-phenylmaleimide was continuously added in the presence of styrene and acrylonitrile so that they were polymerized to obtain a copolymer resin ($R_2$) comprising 62 parts by weight of styrene, 23 parts by weight of acrylonitrile and 15 parts by weight of N-phenylmaleimide. $R_1$ and $R_2$ were mixed together at a ratio of 1:3.3 and the resultant resin was evaluated in the same manner as in Example 1. Results are also given in Table 1. Compared with Example 1 in which the content of the rubbery polymer was equal, the maximum permissible impact strength was lower.

TABLE 1

| Details | Unit | Ref. Ex. 1 | Ex. 1 | Comparative Example 1 | 2 | 3 | 4 | Example 2 | 3 | Comp. Ex. 5 | 6 |
|---|---|---|---|---|---|---|---|---|---|---|---|
| Structure of rubber dispersed copolymer resin | | | | | | | | | | | |
| Composition of rubber dispersed resin: | | | | | | | | | | | |
| Amount of the rubbery polymer | wt. % | — | 14 | 14 | 14 | 14 | 14 | 10 | 7 | 7 | 14 |
| Total amount (e) of the copolymers in GCP and the continuous phase | wt. % | — | 86 | 86 | 86 | 86 | 86 | 90 | 93 | 93 | 86 |
| Content of the maleimide-type monomer in (e) | wt. % | — | 15 | 15 | 15 | 29 | 0 | 11 | 13 | 13.4 | 16 |
| Content of the styrene-type monomer in (e) | wt. % | — | 62 | 63 | 62 | 52 | 73 | 65 | 63.5 | 63 | 61 |
| Content of the acrylonitrile-type monomer in (e) | wt. % | — | 23 | 22 | 23 | 19 | 27 | 24 | 23.5 | 23.6 | 23 |
| Proportion (a) of GCP per 100 parts by weight of the rubbery polymer | wt. % | — | 87 | 130 | 80 | 95 | 75 | 70 | 82 | 95 | 33 |
| Content [X,(b)] of the copolymerized maleimide-type monomer in GCP | wt. % | — | 12 | 13 | 5 | 28 | 0 | 11.5 | 11 | 28 | 24 |
| Content [Y,(c)] of the copolymerized maleimide-type monomer in the continuous phase | wt. % | — | 15.5 | 15.5 | 16.5 | 29.2 | 0 | 11 | 13.1 | 11.8 | 15.5 |
| Y/X (d) | — | — | 1.29 | 1.19 | 3.3 | 1.04 | — | 0.96 | 1.19 | 0.42 | 0.65 |
| Crosslinking degree index of the dispersed phase | times | — | 8.2 | 7.5 | 8.5 | 7.1 | 8.5 | 9.0 | 8 | 7.0 | 8.0 |
| Reduced viscosity of the copolymer in the continuous phase | dl/g | — | 0.75 | 0.75 | 0.73 | 0.74 | 0.75 | 0.77 | 0.75 | 0.74 | 0.74 |
| Physical property | | | | | | | | | | | |
| Evaluation results of Physical properties | | | | | | | | | | | |
| Izod impact strength | kg · cm/cm | 7 | 11.5 | 10 | 10 | 7 | 12 | 10 | 6 | 4 | 12 |
| Vicat softening point | °C. | 127 | 129 | 128 | 128 | 137 | 110 | 119 | 126 | 125 | 129 |

TABLE 1-continued

| | | | | | | | | | | | |
|---|---|---|---|---|---|---|---|---|---|---|---|
| Difference in short shot hydraulic pressure | kg/cm² | standard | −5 | +2 | −4 | −2 | −25 | −10 | −9 | −8 | −4 |
| Maximum permissible impact strength: | | | | | | | | | | | |
| Area (1) | kg · cm | 29 | 42 | 43 | 15 | 18 | 51 | 41 | 26 | 11 | 25 |
| Area (2) | kg · cm | 26 | 45 | 42 | 10 | 15 | 60 | 40 | 25 | 7 | 22 |
| Area (3) | kg · cm | 63 | 70 | 75 | 60 | 62 | 80 | 75 | 35 | 30 | 60 |

EXAMPLE 4

A. Production of rubber dispersed copolymer resin (MG type):

A dispersed multicomponent gel containing polymer was produced by using a continuous bulk polymerization apparatus in which a preheater and a vacuum tank were successively connected to the outlet of a set of 5 stirrer-equipped reactors arranged in series. To the first reactor, there was continuously supplied a feed solution which consisted of 25 parts by weight of a rubbery polymer (block SBR formed of 25 parts by weight of styrene component and 75 parts by weight of polybutadiene), 20 parts by weight of ethylbenzene, 40 parts by weight of styrene, 10 parts by weight of α-methylstyrene and 24 parts by weight of acrylonitrile. The stirrer of the first reactor was driven at 350 r.p.m. In addition, 3 parts by weight and 22 parts by weight of N-phenylmaleimide were continuously fed to the second and third reactors respectively. An organic peroxide and dodecyl mercaptan were employed as a polymerization initiator and molecular weight regulator respectively. The temperature of the preheater was maintaind at 260°–280° C., while the degree of vacuum of the vacuum tank was set at 70 torr. The reaction temperature was controlled to adjust the content of the rubbery polymer at 14 parts by weight in the final dispersed gel-containing copolymer.

B. Analysis of polymer:

B-1. Structural analysis of dispersed gel phase and confirmation of formation of dispersed gel phase:

The reaction mixture was sampled from the outlet of the first reactor to analyze the structure of the dispersed gel phase. To the thus-obtained reaction mixture, p-tert-butyl cathecol was added to a concentration of 200 ppm. Portions of the resultant mixture were treated, respectively, at 60° C. and 10 torr for 3 hours, at 100° C. and 10 torr for 3 hours, at 200° C. and 10 torr for 2 hours and at 250° C. and 70 torr for 2 hours, thereby removing unreacted monomers and solvent. No substantial polymerization was found to take place by such operations.

One gram of the above-treated resin was left over for 24 hours in 30 cc of a 7:3 mixed solvent of methyl ethyl ketone and methanol and insoluble matter was then separated by centrifugation. After drying the insoluble matter, it was analyzed by elemental analysis and IR analysis and its composition was determined by using material balance data. Results are shown in Table 2.

An electron micrograph (transmission-type, 10,000 magnifications) of the above-treated resin was taken to determine whether a dispersed gel phase had been formed or not. Results are also shown in Table 2.

B-2. Structural analysis of dispersed multicomponent gel:

One gram of the final copolymer was left over for 24 hours in a 7:3 mixed solvent of methyl ethyl ketone and methanol, followed by separation into soluble matter and insoluble matter by centrifugation. The insoluble matter was dried and then analyzed by elemental analysis and IR analysis. By using material balance data in the production steps, its composition was determined. The soluble matter was subjected to reprecipitation by using 400 cc of methanol. The copolymer of the continuous phase was collected. After its drying, its composition was analyzed. Furthermore, 0.25 g of the copolymer was dissolved in 50 cc of dimethylformamide and the reduced viscosity of the copolymer was measured by means of a Ubbelohde's viscometer. In addition, its crosslinking degree index was also determined.

An electron micrograph (transmission type, 10,000 magnifications) of the final copolymer was taken to investigate the cells in the gel. Results are also given in Table 2. Results of its molding and evaluation results of its physical properties are also shown in Table 2.

EXAMPLE 5

Production of a resin and its evaluation were conducted in the same manner as in Example 4 except that polybutadiene was used as a rubbery polymer. Results are shown in Table 2.

COMPARATIVE EXAMPLE 7

A resin was produced and evaluated in the same manner as in Example 5 except that N-phenylmaleimide was added in amounts of 3 parts by weight and 22 parts by weight to the first and second reactors respectively. A copolymer containing the maleimide monomer as a component was contained in the dispersed gel phase. A copolymer containing a dispersed gel, which was not a multicomponent gel, was obtained. The copolymer was outside the scope of the present invention. As a result of evaluation of its physical properties, its Izod impact strength, Vicat softening point and moldability were comparable with those of the resin of Example 5 but it was inferior in maximum permissible impact strength to the resin of Example 5. Results are shown in Table 2.

COMPARATIVE EXAMPLE 8

A resin was produced and evaluated in the same manner as in Example 1 except that the rubbery polymer was changed to 3 parts by weight of polybutadiene and block SBR composed of 40 parts by weight of styrene component and 60 parts by weight of polybutadiene. There was obtained a copolymer containing a multicomponent gel dispersed therein. The diameters of cells contained in the multicomponent gel were so small that the copolymer was outside the scope of the present invention. Compared with the resin of Example 1, its maximum permissible impact strength was inferior.

COMPARATIVE EXAMPLE 9

A resin was produced and evaluated in the same manner as in Example 2 except that the stirrer of the first reactor was driven at 90 r.p.m. and the temperature of the preheater was changed to 290°–310° C. The dispersed multicomponent gel contained a copolymer so much that the resultant composition was outside the scope of the present invention. Compared with the resin of Example 4, its maximum permissible impact strength was inferior.

COMPARATIVE EXAMPLE 10

After polymerizing 8 parts by weight of styrene, 2 parts by weight of α-methylstyrene and 3 parts by weight of acrylonitrile in the presence of 14 parts by weight of a polybutadiene rubber latex by a batchwise emulsion polymerization technique, 10 parts by weight of N-phenylmaleimide, 10 parts by weight of styrene, 2 parts by weight of α-methylstyrene and 5 parts by weight of acrylonitrile were polymerized further. The resultant dispersed multicomponent contained little copolymer and its cells had smaller diameters. A composition outside the scope of this invention was thus obtained. Especially, its maximum permissible impact strength was low.

TABLE 2

| Details | Unit | Example 4 | Example 5 | Comparative Example 7 | Comparative Example 8 | Comparative Example 9 | Comparative Example 10 |
|---|---|---|---|---|---|---|---|
| Analysis results | | | | | | | |
| Formation of dispersed gel phase | — | Formed | Formed | Formed | Formed | Formed | —* |
| Composition of the dispersed gel phase: | | | | | | | |
| Content of the rubbery polymer | wt. % | 53 | 67 | 63 | 71 | 35 | —* |
| Content of the copolymer | wt. % | 47 | 33 | 37 | 29 | 65 | —* |
| Composition of the copolymer: | | | | | | | |
| Styrene-type monomer | wt. % | 73 | 73 | 61 | 73 | 73 | —* |
| Acrylonitrile-type monomer | wt. % | 27 | 27 | 23 | 27 | 27 | —* |
| Maleimide-type monomer | wt. % | 0 | 0 | 16 | 0 | 0 | —* |
| Composition of dispersed multicomponent gel: | | | | | | | |
| Content of the rubbery polymer | wt. % | 42 | 51 | —* | 60 | 26 | —* |
| Content of the copolymer | wt. % | 58 | 49 | —* | 40 | 74 | —* |
| Composition of the copolymer: | | | | | | | |
| Styrene-type monomer | wt. % | 63 | 63 | —* | 63 | 64 | —* |
| Acrylonitrile-type monomer | wt. % | 24 | 24 | —* | 24 | 24 | —* |
| Maleimide-type monomer | wt. % | 13 | 13 | —* | 13 | 12 | —* |
| Proportion of multicomponent gel particles** containing cells of at least 0.05 μm across | wt. % | 79 | 99 | —* | 40 | 99 | 0 |
| Crosslinking degree index | times | 8 | 8 | —* | 10 | 8 | 9 |
| Copolymer of continuous phase: | | | | | | | |
| Existence of the three component, i.e., maleimide-type, styrene-type and acrylonitrile-type monomers (by IR spectrophotometer and elemental analysis) | — | yes | yes | yes | yes | yes | yes |
| Reduced viscosity | dl/g | 0.82 | 0.82 | 0.82 | 0.82 | 0.82 | 0.82 |
| Physical property | | | | | | | |
| Evaluation results of physical properties | | | | | | | |
| Izod impact strength (notched, 6.4 mm thick) | kg · cm/cm | 12 | 10 | 10 | 7 | 6 | 10 |
| Vicat softening point | °C. | 129 | 129 | 129 | 129 | 129 | 129 |
| Difference in short shot hydraulic pressure | kg/cm² | −15 | −15 | −14 | −10 | −10 | −13 |
| Maximum permissible impact strength: | | | | | | | |
| Area (1) | kg · cm | 55 | 50 | 29 | 20 | 25 | 18 |
| Area (2) | kg · cm | 54 | 49 | 30 | 15 | 35 | 15 |
| Area (3) | kg · cm | 83 | 65 | 37 | 35 | 40 | 25 |

*Hyphen (—) indicates that no analysis was conducted (due to lack of corresponding matter).
**The whole dispersed gel was supposed to be 100 wt. %.

What is claimed is:

1. A rubber dispersed copolymer resin composition comprising:
   (a) a dispersed phase which is formed by the occlusion of a copolymer of a styrene monomer, an acrylonitrile monomer, and a maleimide monomer in a rubber, by the graft-copolymerization of said monomers to said rubber, or by the occlusion of a copolymer of said monomers in said graft copolymer, the crosslinking degree index of the dispersed phase being 4 to 11; and
   (b) a continuous phase which is formed of a copolymer of an additional portion of said monomers, the reduced viscosity of a 0.5 weight percent solution of the continuous phase forming copolymer in dimethylformamide being 0.5 to 1.0 dl/g at 30° C.;
   the portion of said copolymer (GCP) which is occluded and grafted in said dispersed phase being 50 to 100 parts by weight based on 100 parts by weight of rubber;
   said rubber being contained in an amount of 3 to 20 weight percent, said GCP being 1.5 to 20 weight percent and said copolymer in the continuous phase being 95.5 to 60 weight percent, said weight percentages being based on the total weight of said resin composition;
   wherein the total amount of monomer in both said GCP and said copolymer in the continuous phase is 100 weight percent, said GCP and said copolymer in the continuous phases comprising 30 to 80 weight percent of said styrene monomer, 10 to 50 weight percent of said acrylontrile monomer, 1 to 25 weight percent of said maleimide methacrylic ester monomers and acrylic ester monomers; and
   said rubber is selected from the group consisting of polybutadiene rubber, acrylonitrile-butadiene copolymer rubber, styrene-butadiene copolymer rubber, acrylic rubber and ethylene-propylene-diene terpolymer rubber, and is copolymerized after being dissolved in a portion or the whole portion of one or more of the monomers without the use of a rubber latex.

2. The rubber dispersed copolymer resin as claimed in claim 1 wherein
   (a) the portion (DX) of the copolymerized maleimide monomer in the GCP is 1 to 25 weight percent;
   (b) the portion (Y) of the additional portion of the copolymerized maleimide in the continuous phase is 1 to 25 weight percent; and
   (c) X and Y satisfy the following inequality (I):

$$0.5 < Y/X < 2.0 \quad \text{(I)}.$$

3. The rubber dispersed copolymer resin as claimed in claim 1 wherein, X and Y satisfy the following inequality (I'):

$$0.6 < Y/X < 1.5 \quad \text{(I')}.$$

4. The rubber dispersed copolymer resin as claimed in claim 1 wherein the styrene monomer is at least partially replaced by a monomer, selected from the group consisting of α-methylsyrene, α-ethylstyrene, vinyltoluene, vinylxylene, o-t-butylstyrene, p-t-butylstyrene, p-methylstyrene, monochlorstyrene, dichlorstyrene, tribromostyrene, tetrabromostyrene, p-hydroxystyrene and o-methyoxystyrene.

5. The rubber dispersed copolymer resin as claimed in claim 1 wherein the acylonitrile monomer is at least partially replaced by a monomer, selected from the gorup consisting of methacrylonitrile, fumaronitrile, maleonitrile and α-chloroacrylonitrile.

6. The rubber dispersed copolymer resin as claimed in claim 1 wherein the maleimide monomer is at least partially replaced by a monomer selected from the group consisting of N-methylmaleimide, N-ethylmaleimide, N-propylmaleimide, N-t-butylmaleimide, N-isopropylmaleimide, N-cyclohexlmaleimide, N-phenylmaleimide, N-naphtylmaleimide and N-o-chlorophenylmaleimide.

* * * * *